(12) United States Patent
Kerkman et al.

(10) Patent No.: US 7,164,254 B2
(45) Date of Patent: Jan. 16, 2007

(54) MODULATION METHODS AND APPARATUS FOR REDUCING COMMON MODE VOLTAGES

(75) Inventors: Russel J. Kerkman, Milwaukee, WI (US); Qiang Yin, Shanghai (CN); Haihui Lu, Shanghai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 25 days.

(21) Appl. No.: 11/068,323

(22) Filed: Feb. 28, 2005

(65) Prior Publication Data
US 2006/0192522 A1 Aug. 31, 2006

(51) Int. Cl.
*H02P 3/18* (2006.01)

(52) U.S. Cl. ............... 318/812; 318/800; 318/801; 318/803; 318/727; 363/37; 363/44

(58) Field of Classification Search ............... 318/373, 318/599, 375, 727, 254, 801; 363/37, 40, 363/41, 71
See application file for complete search history.

(56) References Cited

U.S. PATENT DOCUMENTS

| | | | | |
|---|---|---|---|---|
| 5,977,741 | A * | 11/1999 | DeLange et al. | 318/801 |
| 6,166,930 | A * | 12/2000 | Czerwinski | 363/44 |
| 6,185,115 | B1 * | 2/2001 | Sul et al. | 363/37 |
| 6,307,336 | B1 * | 10/2001 | Goff et al. | 318/254 |
| 6,424,113 | B1 * | 7/2002 | Kelly et al. | 318/599 |
| 6,795,323 | B1 * | 9/2004 | Tanaka et al. | 363/41 |
| 6,842,354 | B1 * | 1/2005 | Tallam et al. | 363/98 |
| 6,859,374 | B1 * | 2/2005 | Pollanen et al. | 363/69 |
| 6,922,032 | B1 * | 7/2005 | Maeda | 318/373 |
| 2002/0113570 | A1 * | 8/2002 | Heikkila | 318/727 |

(Continued)

FOREIGN PATENT DOCUMENTS

TW 439350 6/2001

OTHER PUBLICATIONS

Hyeoun-Dong Lee; Seung-Ki Sul, "A Common Mode Voltage Reduction in Boost Rectifier/Inverter System by Shifting Active Voltage Vector in a Control Period", IEEE Trans. on PE, vol. 15 No. 6, pp. 1094-1101, Nov. 2000.

(Continued)

*Primary Examiner*—Paul Ip
(74) *Attorney, Agent, or Firm*—Quarles & Brady LLP; William R. Walbrun (57) ABSTRACT

Methods and apparatus for reducing the common mode voltage generated by eliminating zero-voltage vectors in a rectifier/inverter variable frequency drive (VFD) system includes comparing three phase voltages to each other to determine a maximum voltage in one phase, a minimum voltage in another phase and a middle voltage in still another phase, inverting phase voltages for one phase having the maximum voltage and another phase having the minimum voltage, comparing the phase voltages to a carrier wave to determine gating signals for three respective phases of the inverter, and inverting gating signals for the one phase having the maximum voltage and for another phase having the minimum voltage to reduce the common mode voltage in the motor. In one embodiment, the zero-voltage vectors are removed by relating a first plurality of gating signals and a plurality of sector logic signals in a logic table to a second plurality of gating signals that are applied to phases of the inverter

14 Claims, 13 Drawing Sheets

U.S. PATENT DOCUMENTS

| | | | |
|---|---|---|---|
| 2002/0121875 A1* | 9/2002 | Kelly et al. | 318/599 |
| 2002/0172058 A1* | 11/2002 | Szczesny et al. | 363/40 |
| 2004/0032755 A1* | 2/2004 | Pollanen et al. | 363/71 |
| 2004/0183490 A1* | 9/2004 | Maeda | 318/375 |
| 2006/0034364 A1* | 2/2006 | Breitzmann et al. | 375/238 |
| 2006/0067092 A1* | 3/2006 | Nondahl et al. | 363/37 |

OTHER PUBLICATIONS

Hyeoun-Dong Lee; Seung-Ki Sul, "Common-Mode Voltage Reduction Method Modifying the Distribution of Zero-Voltage Vector in PWM Converter/Inverter System", IEEE Trans. on IA, vol. 37, No. 6, pp. 1732-1738, Nov.-Dec. 2001.

Ahmet M. Hava, Russel J. Kerkman and Thomas A. Lipo, "Carrier-Based PWM-VSI Overmodulation Strategies: Analysis, Comparison, and Design", IEEE Trans. on PE, pp. 674-689, vol. 13, No. 4, Jul. 1998.

Ahmet M. Hava, Russel J. Kerkman and Thomas A. Lipo, "Simple Analytical and Graphical Methods for Carrier-Based PWM-VSI Drives", IEEE Trans. on PE, pp. 49-61, vol. 14, No. 1, Jan. 1999.

A.M. De Broe, A.L. Julian, T.A. Lipo, "Neutral-To-Ground Voltage Minimization In A PWM-Rectifier/Inverter Configuration", IEE on Power Electronics and Variable Speed Drives,, pp. 564-568, Sep. 23-25, 1996.

Mario Cacciato, Alfio Consoli, Giuseppe Scarcella and Antonio Testa, "Reduction of Common-Mode Currents in PWM Inverter Motor Drives", IEEETrans. on Industry Applications, vol. 35, No. 2, pp. 469-476, Mar./Apr. 1999.

* cited by examiner

S2S1S0 (sectors)

| G1G3G5 | | 1<br>001 | 2<br>010 | 3<br>011 | 4<br>100 | 5<br>101 | 6<br>110 |
|---|---|---|---|---|---|---|---|
| V0 | 000 | 0 | 1 | 1 | 0 | 1 | 1 |
| V5 | 001 | 0 | 0 | 0 | 0 | 0 | 0 |
| V3 | 010 | 1 | 1 | 1 | 1 | 1 | 1 |
| V4 | 011 | 1 | 1 | 1 | 1 | 1 | 1 |
| V1 | 100 | 0 | 0 | 0 | 0 | 0 | 0 |
| V6 | 101 | 0 | 0 | 0 | 0 | 0 | 0 |
| V2 | 110 | 1 | 1 | 1 | 1 | 1 | 1 |
| V7 | 111 | 1 | 0 | 0 | 1 | 0 | 0 |

S2S1S0 (sectors)

| G1G3G5 | | 1<br>001 | 2<br>010 | 3<br>011 | 4<br>100 | 5<br>101 | 6<br>110 |
|---|---|---|---|---|---|---|---|
| V0 | 000 | 1 | 1 | 0 | 1 | 1 | 0 |
| V5 | 001 | 1 | 1 | 1 | 1 | 1 | 1 |
| V3 | 010 | 0 | 0 | 0 | 0 | 0 | 0 |
| V4 | 011 | 1 | 1 | 1 | 1 | 1 | 1 |
| V1 | 100 | 0 | 0 | 0 | 0 | 0 | 0 |
| V6 | 101 | 1 | 1 | 1 | 1 | 1 | 1 |
| V2 | 110 | 0 | 0 | 0 | 0 | 0 | 0 |
| V7 | 111 | 0 | 0 | 1 | 0 | 0 | 1 |

Fig. 19

MODULATION METHODS AND APPARATUS FOR REDUCING COMMON MODE VOLTAGES

CROSS-REFERENCE TO RELATED APPLICATIONS

NOT APPLICABLE

STATEMENT REGARDING FEDERALLY SPONSORED RESEARCH

NOT APPLICABLE

TECHNICAL FIELD

The field of the invention is control systems for controlling the operation of AC motors.

BACKGROUND ART

A well known type of AC drive includes an AC-to-DC converter including a boost rectifier for converting three-phase AC source voltages to DC voltages on a DC bus. The DC bus interfaces the AC-to-DC converter to a DC-to-AC inverter, which is typically a three-phase bridge network of solid state switches, which are switched at high frequency to generate pulse width modulation (PWM) or other types of modulated low frequency power signals which are supplied to an AC motor. These systems generate a common mode voltage, for example, a voltage measured between a neutral in the motor and an electrical ground. These also generate common mode currents in part the result of parasitic capacitances between mechanical parts in the motor and ground, and between mechanical parts in the motor and the stator windings. It is desirable to attenuate or eliminate these voltages to prevent interference that might trip fault protection devices and to reduce currents in motor bearings that might reduce their service life. Passive circuits including filters and transformers have been employed to correct this problem, but with increased production costs and increased installation costs. A number of prior art publications have suggested modifications to inverter modulation methods to control the inverter common mode voltages. This approach has cost and manufacturing advantages over passive circuits.

The inverter switching states can be modeled with the aid of a space vector PWM (SVPWM) theory and diagram more fully described below. Two of the vectors in this theory are zero-voltage switching vectors (V0 and V7). Some prior art methods skip these vectors by using two active vectors that are 180 degrees out of phase. However, these modified modulation schemes require that dwell time (on time for the inverter switches) be calculated in real time.

Some modified modulators shift the active voltage vectors of the inverter to align with those of the boost rectifier. With this strategy, it is possible to eliminate one common-mode voltage pulse in every switching period by shifting the active voltage vectors of the inverter to align with those of the boost rectifier. Compared with the conventional three-phase SVPWM methods, this proposed method can reduce the total number of common-mode voltage pulses to two-thirds. However, this SVPWM strategy cannot be applied to diode front-end variable frequency drive (VFD) systems that are more common in AC motor drives. For those modified modulators for active front-end VFD systems, dwell times are calculated in real time to shift the active voltage vectors, and those shifts are performed in each switching period.

It would be advantageous to provide common-mode voltage reduction methods for a PWM carrier-based modulator by eliminating zero-voltage vectors.

SUMMARY OF THE INVENTION

The present invention relates generally to methods for reducing the common mode voltage generated by removing zero-voltage vectors in a converter/inverter variable frequency drive system. This invention is more particularly applied for common mode voltage reduction in a preferred embodiment in which modulation techniques are based on carrier-based pulse width modulation (PWM). The proposed common mode voltage reduction methods can be applied to a carrier-based PWM modulator.

In a method of the invention, the three phase voltages are compared to each other to determine a maximum voltage in one phase, a minimum voltage in another phase and a middle voltage in still another phase. The phase voltages are also compared to a carrier wave to produce gating signals for turning on switches in a three-phase inverter. For the one phase having the maximum voltage and for another phase having the minimum voltage the phases are inverted prior to their comparison with the carrier wave to produce the gating signals. The gating signals for the one phase having the maximum voltage and for another phase having the minimum voltage are then inverted. This method produces gating signals that will reduce the peak-to-peak common mode voltage in the motor.

The determination of maximum, minimum and middle voltages in each time period and the inverting of the modulated phase signals can be carried out by a microelectronic CPU executing a stored control program of instructions, or these acts can be carried out with non-CPU logic circuitry. The inverting of the gating signals can be also performed by a microelectronic CPU or by non-CPU logic circuitry.

In still another variation of the invention, certain zero-voltage vectors are removed in a non-CPU logic circuit in which a first plurality of gating signals and a plurality of sector logic signals are related in a logic table to a second set of gating signals that are applied that eliminate the zero-vectors in the space vector diagram model ("SVPWM").

The invention will enable one to reduce the peak-to-peak common mode voltage using a lower cost solution than the prior art.

These and other objects and advantages of the invention will be apparent from the description that follows and from the drawings which illustrate embodiments of the invention, and which are incorporated herein by reference.

DETAILED DESCRIPTION OF THE PREFERRED EMBODIMENTS

Figure 1:
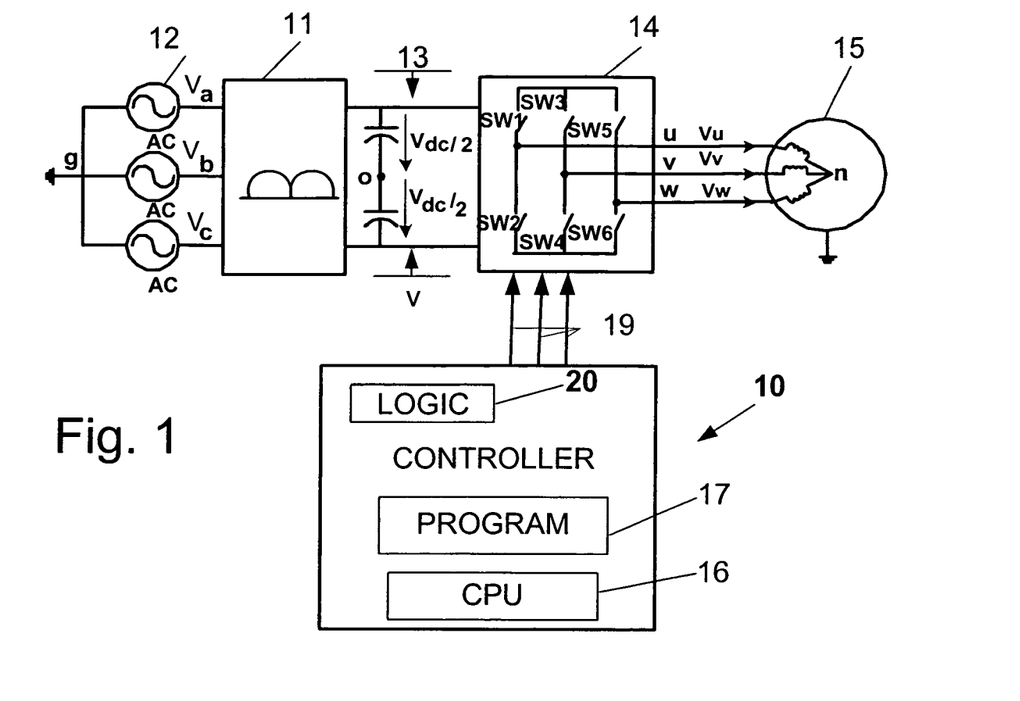
FIG. 1 is a block diagram of a motor drive for practicing the methods of the present invention.

FIG. 1 illustrates a block diagram of an AC drive controller 10 for controlling an AC-to-DC converter 11 including a converter, for example, a boost rectifier, for converting three-phase AC source voltages, $V_a$, $V_b$ and $V_c$, from an AC voltage supply 12 to DC voltages, $V_{dc}$, on a DC bus 13. The DC bus 13 interfaces the AC-to-DC converter 11 to a DC-to-AC inverter 14, which is typically a three-phase bridge network of solid state switches SW1–SW6, which are switched at high frequency to generate pulse width modulation (PWM) or other types of modulated low frequency power signals $V_u$, $V_v$, $V_w$, which are applied to an AC motor 15.

The controller 10 includes a microelectronic CPU 16 operating according to instructions in a control program 17 stored in memory. The program 17 includes instructions for performing regulation of a DC bus voltage and regulation of current supplied to the motor 15. The controller provides gating signals 19 to control the switching of the switches SW1–SW6 in the inverter 14. These switches SW1–SW6 are preferably IGBT's of a type well known in the art.

The common mode voltage (CMV) is defined in expression 1) below as the voltage difference between the neutral point "n" in the motor 15 and the ground "g" for the AC voltage supply 12. It is the sum of the voltage $V_{no}$ between the midpoint "o" of the DC bus and the neutral point "n" in the motor 15 and the voltage $V_{og}$ between the midpoint "o" of the DC bus 13 and ground "g" for the AC voltage supply 12. The voltages $V_{no}$ and $V_{og}$ are three-phase voltages summed from the individual phase voltages of the motor 18 and the AC voltage supply 12 as shown in expressions 2) and 3) below.

$$CMV = V_{ng} = V_{no} + V_{og} \quad 1)$$

$$V_{no} = (V_{uo} + V_{vo} + V_{wo})/3 \quad 2)$$

$$V_{og} = -(V_{ao} + V_{bo} + V_{co})/3 \quad 3)$$

The frequency and amplitude of $V_{no}$ is determined by the AC supply mains, which produce a positive 180 Hz (or 150 Hz) ripple waveform and negative 180 Hz (or 150 Hz) ripple waveform in the common mode voltage. Another part of CMV, $V_{no}$, is related to the inverter modulation, and its amplitude is shown in Table 1 below.

TABLE 1

Common mode voltages for diode front-end variable frequency drive system.

| Vector | State (G1, G3, G5) | $V_{uo}$ | $V_{vo}$ | $V_{wo}$ | $V_{no}$ |
|---|---|---|---|---|---|
| $V_0$ | 0, 0, 0 | $-V_{dc}/2$ | $-V_{dc}/2$ | $-V_{dc}/2$ | $-V_{dc}/2$ |
| $V_1$ | 1, 0, 0 | $V_{dc}/2$ | $-V_{dc}/2$ | $-V_{dc}/2$ | $-V_{dc}/6$ |
| $V_2$ | 1, 1, 0 | $V_{dc}/2$ | $V_{dc}/2$ | $-V_{dc}/2$ | $V_{dc}/6$ |
| $V_3$ | 0, 1, 0 | $-V_{dc}/2$ | $V_{dc}/2$ | $-V_{dc}/2$ | $-V_{dc}/6$ |
| $V_4$ | 0, 1, 1 | $-V_{dc}/2$ | $V_{dc}/2$ | $V_{dc}/2$ | $V_{dc}/6$ |
| $V_5$ | 0, 0, 1 | $-V_{dc}/2$ | $-V_{dc}/2$ | $V_{dc}/2$ | $-V_{dc}/6$ |
| $V_6$ | 1, 0, 1 | $V_{dc}/2$ | $-V_{dc}/2$ | $V_{dc}/2$ | $V_{dc}/6$ |
| $V_7$ | 1, 1, 1 | $V_{dc}/2$ | $V_{dc}/2$ | $V_{dc}/2$ | $V_{dc}/2$ |

Figure 3:
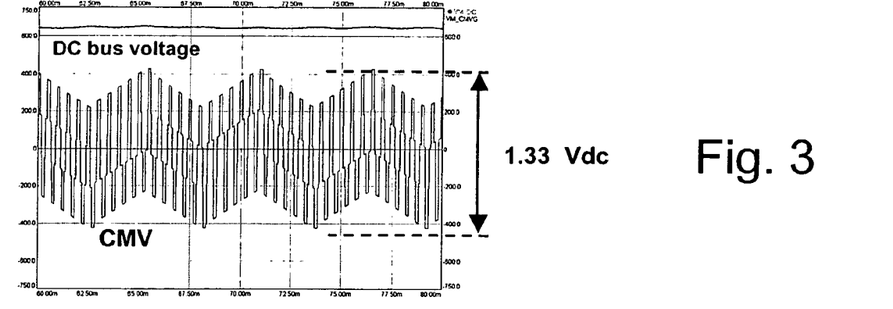
FIG. 3 is a graph of the three-phase common mode voltage (CMV) as a function of time in the system of FIG. 1 without practicing reduction methods for these voltages.
Figure 4:
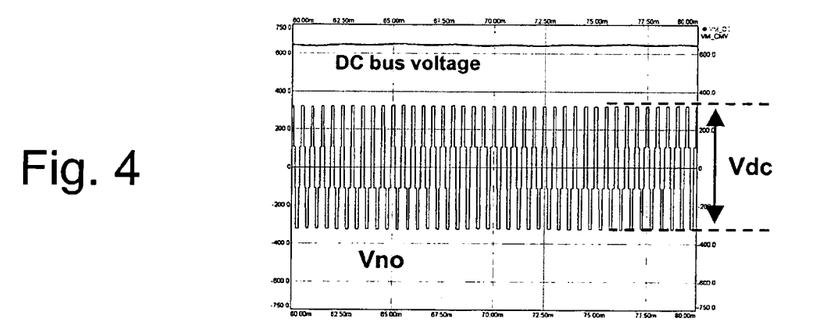
FIG. 4 is a graph of a voltage ($V_{no}$) between a neutral (n) and a dc link midpoint (o) seen in the system of FIG. 1 without practicing reduction methods for these voltages.

An example of the waveform of both CMV and $V_{no}$ for diode front-end VFD system is shown in FIGS. 3 and 4, respectively. According to the switching states configuration summarized in Table 1 above, instantaneous values of $V_{no}$ of the diode front-end VFD system can be determined from equation 4).

$$V_{no} = \begin{cases} \pm \dfrac{V_{dc}}{2} & \text{for } V_0 \text{ and } V_7 \\ \pm \dfrac{V_{dc}}{6} & \text{for other states} \end{cases} \quad 4)$$

Figure 2:
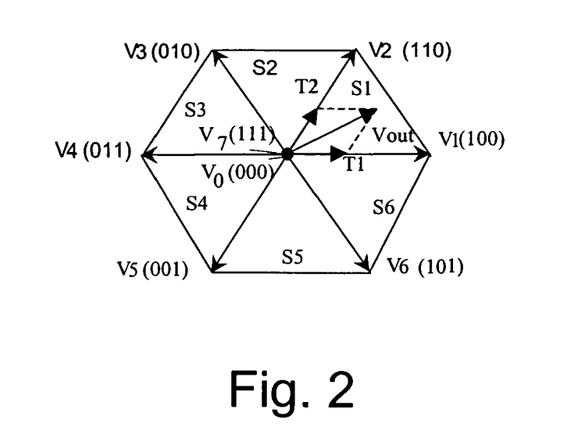
FIG. 2 is a space vector diagram illustrating the direct digital SVPWM principles.

According to the space vector PWM model, there are eight available output voltage vectors (V0–V7) for both the converter and inverter as shown in FIG. 2. There are two zero-voltage vectors V0, V7 and six non-zero voltage vectors (V1–V6). The transition from each non-zero voltage vector to the next non-zero voltage vector defines one of six sectors S1–S6 in the circle diagram in FIG. 2. The possible CMV states for the various output voltage vectors (V0–V7) of the converter/inverter system are summarized in Table 2 as follows as a function of dc voltage, $V_{dc}$.

TABLE 2

Common mode voltages as a function of active converter and inverter output voltage vectors.

| | | Inverter Output Voltage Vector | | | |
|---|---|---|---|---|---|
| | | $V_1$, $V_3$, $V_5$ | $V_2$, $V_4$, $V_6$ | $V_0$ | $V_7$ |
| Converter Output Voltage Vector | $V_1$, $V_3$, $V_5$ | 0 | $V_{dc}/3$ | $-V_{dc}/3$ | $2 V_{dc}/3$ |
| | $V_2$, $V_4$, $V_6$ | $-V_{dc}/3$ | 0 | $-2 V_{dc}/3$ | $V_{dc}/3$ |
| | $V_0$ | $V_{dc}/3$ | $2 V_{dc}/3$ | 0 | $V_{dc}$ |
| | $V_7$ | $-2 V_{dc}/3$ | $-V_{dc}/3$ | $-V_{dc}$ | 0 |

Figure 5:
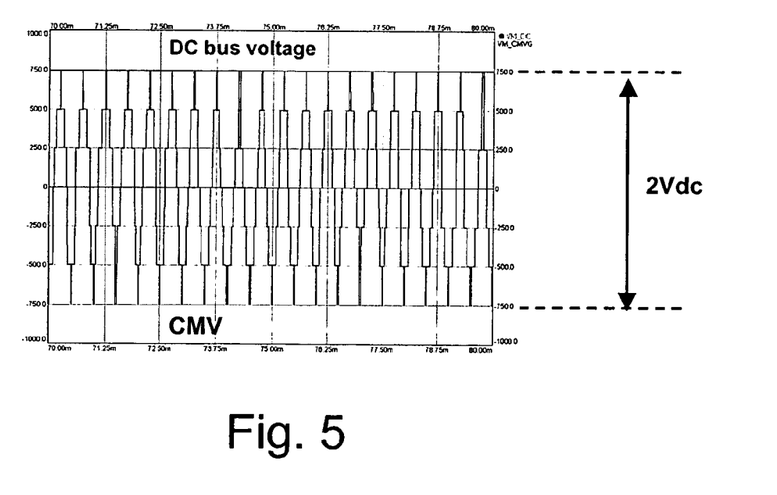
FIG. 5 is a graph of the three-phase common mode voltage (CMV) as a function of time in the system of FIG. 1 with an active controlled converter.

In the case of an asynchronous switching sequence or a different switching frequency between the boost rectifier and inverter, a common mode voltage (CMV) with peak-to-peak amplitude of $2V_{dc}$ can occur, as illustrated in FIG. 5. The $V_{no}$ waveform is equal to $V_{dc}$ as seen in FIG. 4. The waveform for CMV is equal to $2V_{dc}$ for active front-end VFD system as shown in FIG. 5.

It is known in the art that the peak-to-peak amplitude of the common mode voltage generated by active front-end variable frequency drive system can be limited to no more than $1.33V_{dc}$, as seen in FIG. 3, by synchronizing the switching sequence. This is not easy to accomplish when the switching frequency of the boost rectifier and inverter are different.

The proposed common mode voltage reduction methods in this disclosure are operational without calculating direct digital SVPWM dwell times of the inverter sectors SW1–SW6. The invention can be applied to the active converter and inverter modulators, to reduce the common mode voltage (CMV) produced by a diode front-end variable frequency drive system or active front-end system.

Figure 6:
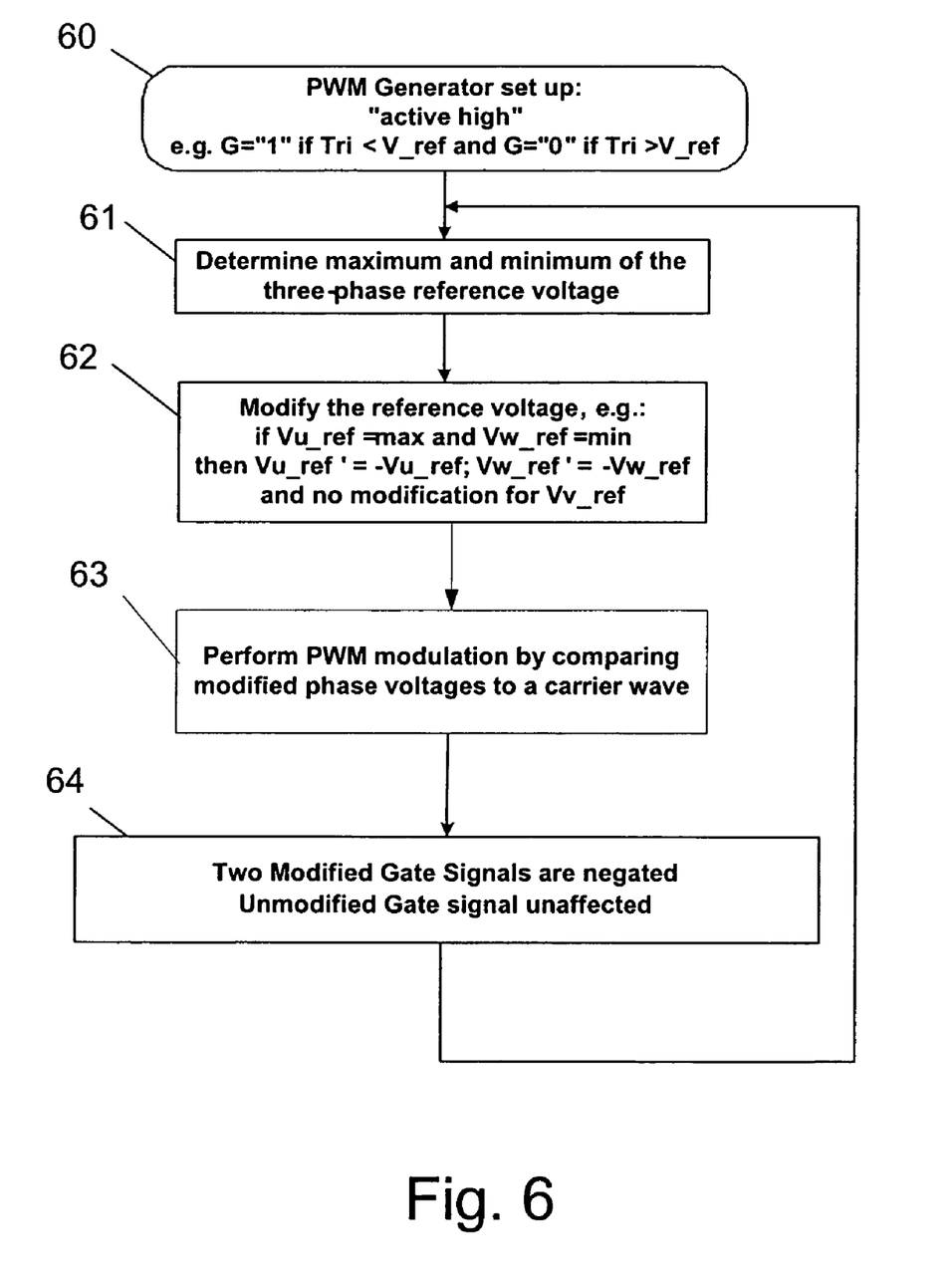
FIG. 6 is a flow chart of a program routine for modifying the switching signals in the inverter to reduce the three-phase common mode voltage.

FIG. 6 shows a routine in the program 17 stored in a memory in the controller 10 for modifying the three-phase reference voltages applied to the motor and then modifying the gating signals G1, G3, G5 that control the turning on of the inverter switches SW1–SW6 in the three legs of the inverter 14. When speaking about turning on switches SW1, SW3, SW5, it is understood, that if one switch SW1 in one leg of the inverter 14 is conducting, then the other switch SW2 in that leg of the inverter 14 is normally not conducting.

In the routine in FIG. 6, the blocks represent groups of program instructions. As represented by the initialization block 60 in FIG. 6, G is set to a "1" if Tri<the $V_{u,v,w\_}^{ref}$ and to a "0" if Tri>the $V_{u,v,w\_}^{ref}$. Next, the maximum and minimum reference phase voltages are determined by comparing the phase voltages to each other as represented by process block 61. Next, two of the phase reference voltages corresponding to the maximum and minimum voltage are inverted as represented by process block 62. Then, the phase voltages are modulated by the carrier wave as represented by process block 63. Next, the gating signals corresponding to the maximum and minimum phase reference voltages are set to be modified (inverted) as represented by process block 64. The routine then loops back to process block 61 to repeatedly determine the maximum, minimum and middle phase voltages for six cycles of the triangular carrier wave corresponding to the six sectors, S1–S6 of the SVPWM diagram.

Figure 7:
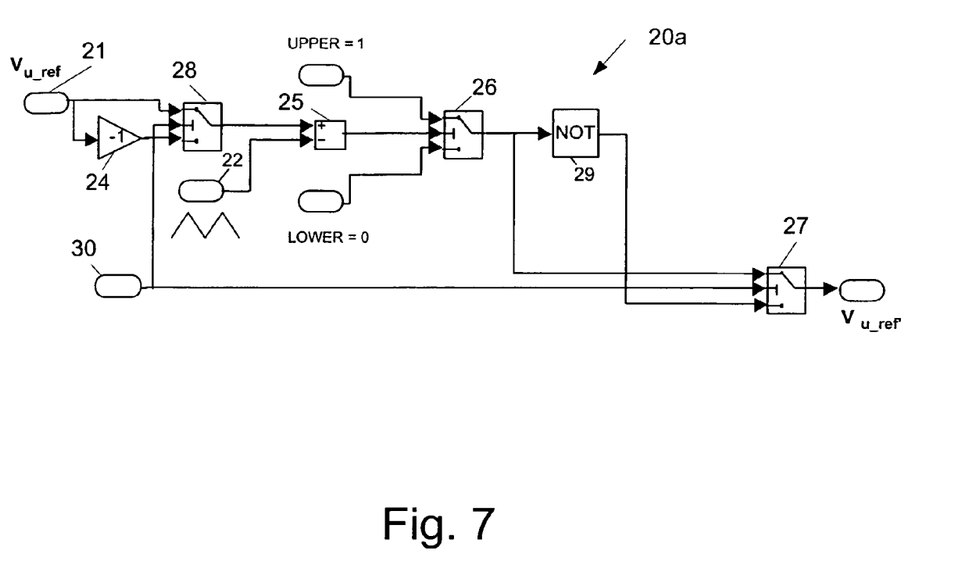
FIG. 7 is a logic diagram for further illustrating the method of FIG. 6.

FIG. 7 shows a preferred embodiment of control program routine 17 operating with logic circuitry 20a for implementing the common mode voltage reduction. Referring in more detail to FIG. 7, which is a PWM modulating logic circuit 20a, a reference phase voltage $V_{u\_ref}$ is an input at terminal 21 and is fed to one input on a selector circuit 28. This reference phase voltage $V_{u\_ref}$ is inverted preferably in program routine 17 (FIG. 1) or by an inverter 24 in logic circuit 20a, and it becomes a second input to a selector circuit 28. The selector circuit 28 is controlled at the middle input by a logic signal representing a determination that this phase represents a maximum phase voltage or a minimum phase voltage, or is a middle phase voltage from among the three phase voltages. This logic signal is output of the control program 17 and is received at input 30.

The phase voltage, $V_{u\_ref}$, either inverted or non-inverted, is fed to a comparator 25 to be compared with a triangular wave carrier, Tri, received from the input 24 by the comparator 25. The resulting modulated phase output voltage is then used at selector circuit 26 to select between a logic high gating signal =1 for the upper switch SW1 or a logic low gating signal =0 for the upper switch SW1. The selector circuit 26 produces a gating signal at its output that is inverted by a "NOT" operator 29 and is also fed as a non-inverted signal to a final selector circuit 27 to produce a gating signal G1 for controlling $V_{u\_ref}'$. The selector circuit 27 is controlled by the logic signal from input 30 representing a determination that this phase represents a maximum phase voltage, a minimum phase voltage or a middle phase voltage from among the three phase voltages. A circuit similar to FIG. 7 is present to process each one of the three phase voltages, $V_{u\_ref}$, $V_{v\_ref}$, $V_{w\_ref}$.

Figure 8:
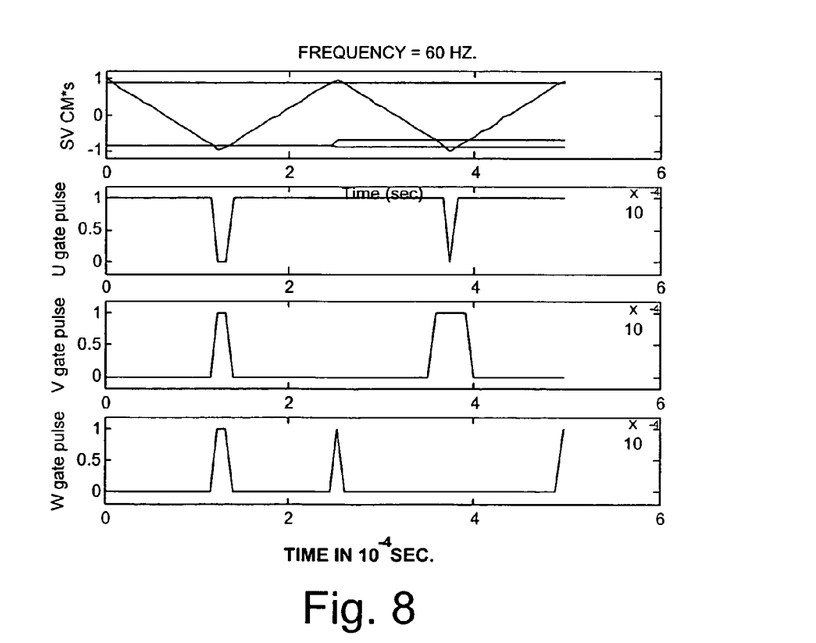
FIG. 8 is graph of the inverter switch gating signals as a function of time using the method of FIGS. 6 and 7.

FIG. 8 illustrates the results of the carrying out the process in FIG. 7, in which at least one of the gate pulses from phases U, V, W, is always an opposite state from the other two gate signals. Thus the first logic low phase U pulse is opposite a high pulse for the phase V gate signal and a high pulse for the phase W gate signal.

Figure 9:
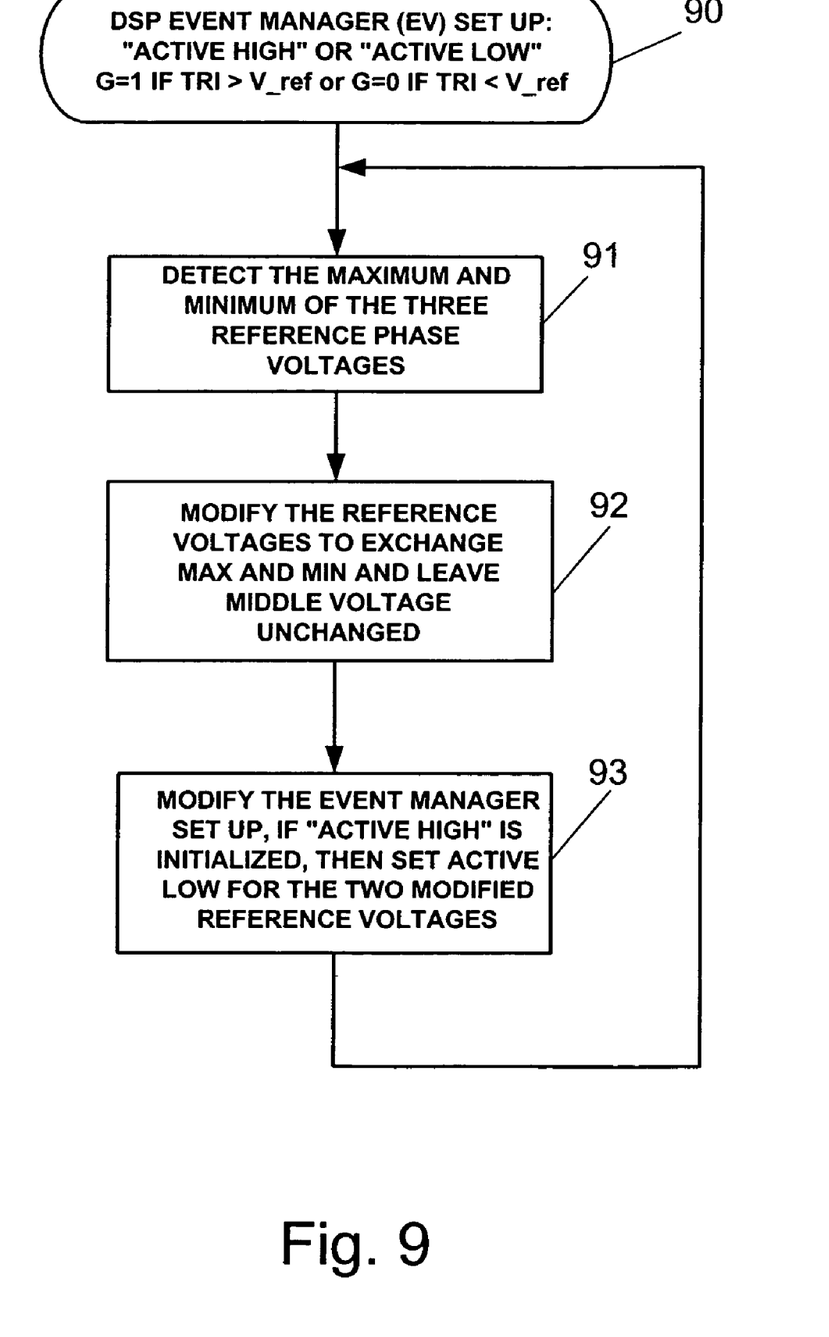
FIG. 9 is a flow chart of a second program routine for modifying the switching signals in the inverter to reduce the three-phase common mode voltage.

FIG. 9 illustrates a second program routine in which the blocks 90–93 represent one or more program instructions executed by the CPU 16 in the controller 10. In this routine, an Event Manager sets up flag values in registers of the CPU to control the gating signals depending on the relative magnitudes of the reference voltages in relation to the carrier wave. As represented by the initialization block 90 in FIG. 9, G is set to a "1" if Tri>the $V_{u,v,w\_ref}$ and to a "0" if Tri<the $V_{u,v,w\_ref}$. Next, the maximum and minimum reference phase voltages are determined as represented by process block 91. Next, the maximum and minimum reference signals are exchanged for one another and inverted as indicated by example in block 92. Then, the gating signal for maximum phase voltage and the gating signal for the minimum phase voltage are inverted as indicated in process block 93. The routine then loops back to process block 91 to repeatedly sense the phase voltages for six cycles of the triangular carrier wave corresponding to the six sectors, S1–S6 of the SVPWM diagram.

FIGS. 10–15 show in detail a switching pattern controlled by the invention through the six sectors S1-S6 of the space vector diagram in FIG. 2.

In FIGS. 10–15, the high or "1" state represents a gate "on" command signal, while the low or "0" state represents a gate "off" command signal. The actual "on" or "off" times are not timed. In these diagrams, the identity of which of the three phase reference voltages $V_{u\_ref}, V_{v\_ref}, V_{w\_ref}$ is the minimum, maximum and mid-value of the three reference voltages determines switching pattern, which in turn determines which sectors in the space vector diagram are entered. The methodology changes the "1" state representing a gate "on" command signal to the low or "0" state or gate "off" command signal for the maximum and minimum reference voltage phases. The gating signal for the mid-level phase voltage is retained at the logic high or "1" state. This prevents switches SW1, SW3 and SW5 from being switched high or "on" at the same time. By using this method, the peak-to-peak amplitude of the common mode voltage can be reduced.

Figure 10:
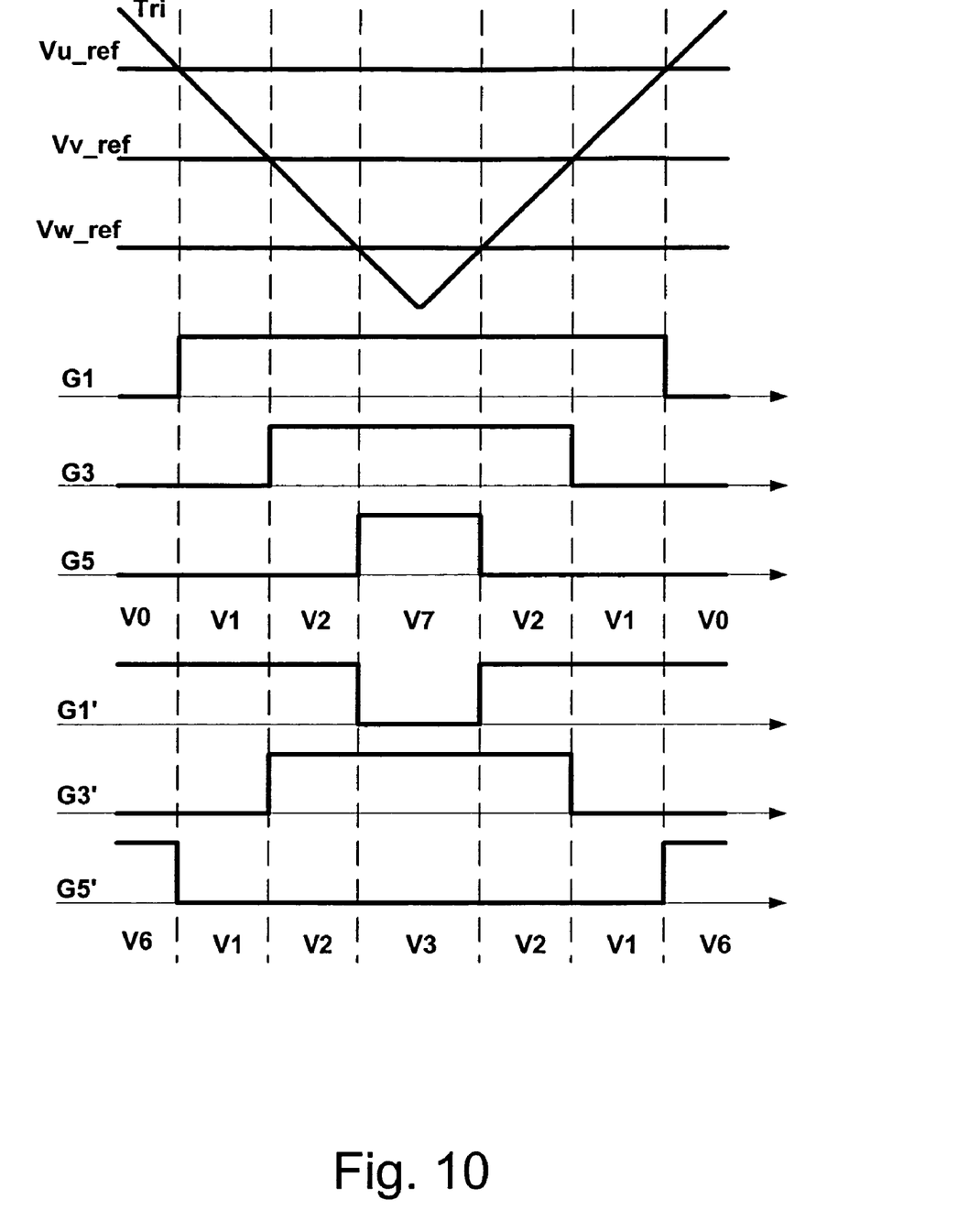
FIGS. 10–15 are diagrams of the gating signals G1, G3, G5 for the inverter switches as a function of time before modification and the gating signals G1', G3', G5' for the inverter switches as a function of time after modification according to the present invention.

In the first switching sequence shown in FIG. 10, the triangular carrier wave, Tri, is shown as it intersects the three reference voltages on the first three axes, for which it is assumed that $V_{u\_ref} > V_{v\_ref} > V_{w\_ref}$. These signals may be sinusoidal signals varying 120 degrees in phase, but at the frequency of the carrier wave (typically 2 Khz–16 Khz) it is assumed that their relative magnitudes can be represented as shown. When their relative magnitudes (maximum, mid-level, minimum) change, the system enters the next switching sequence in one of FIGS. 10–15. The next three axes in FIG. 9 show the conventional gating signals, G1, G3, G5 for switches SW1, SW3, SW5. Gating signal G1 has the longest "on time" because $V_{u\_ref}$ exceeds Tri for the greatest interval. Gating signal G5 has the shortest "on time" because $V_{w\_ref}$ exceeds Tri for the shortest interval. The bottom three axes in FIG. 10 show that the gating signals can be changed so that G1'=1 if $V_{w\_ref}$<Tri; G3'=G3 and G5'=1 if $V_{u\_ref}$<Tri. G1' becomes the inverse of G5 and G5' becomes the inverse of G1, while G3' remains the same as G3. The bottom axis shows the vector states traversed during the switching sequence in FIG. 7. For signals G1, G3, G5, the vectors produced would be V0, V1, V2, V7, V2, V1 and V0. By performing the change to gating signals G1', G3' G5', the vectors produced are V6, V1, V2, V3, V2, V1 and V6. It should be noticed that the operation is basically in Sector S1 going from vector V1 to vector V2 and back, but substituting the V6 and V3 vectors for the zero-voltage vectors, V0 and V7. This reduces the common mode voltage.

Figure 11:
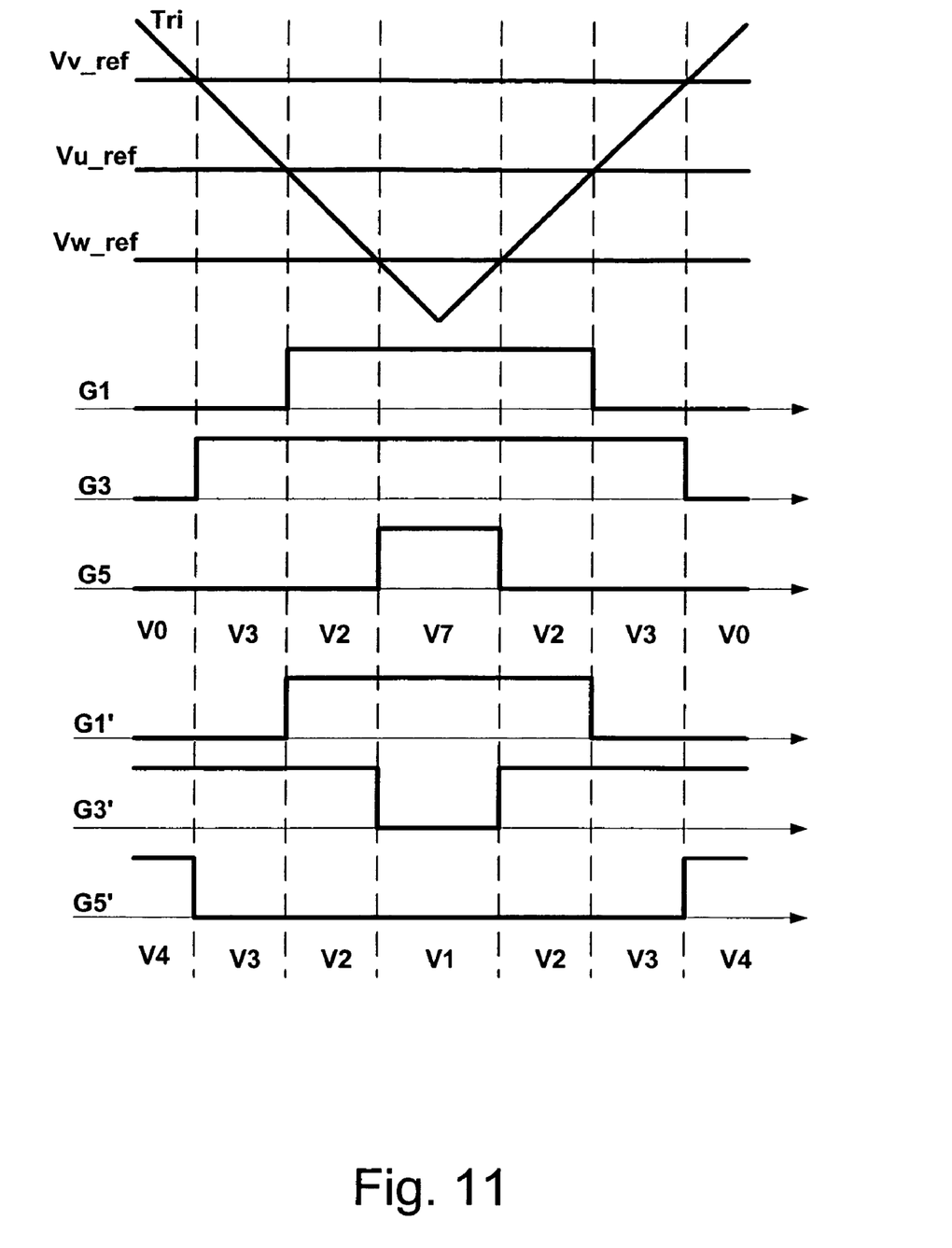

In the second sector, S2, the triangular carrier wave, Tri, is shown in FIG. 11 as it intersects the three reference voltages on the first three axes, for which it is assumed that $V_{v\_ref} > V_{u\_ref} > V_{w\_ref}$. The next three axes in FIG. 11 show the conventional gating signals, G1, G3, G5 for switches SW1, SW3, SW5. Gating signal G3 has the longest "on time" because $V_{v\_ref}$ exceeds Tri for the greatest interval. Gating signal G5 has the shortest "on time" because $V_{w\_ref}$ exceeds Tri for the shortest interval. The bottom three axes in FIG. 11 show that the gating signals can be changed so that G1'=1 if $V_{u\_ref}$>Tri; G3'=0, when $V_{w\_ref}$>Tri and and G5'=0 if $V_{v\_ref}$>Tri. G3' becomes the inverse of G5 and G5' becomes the inverse of G3, while G1' remains the same as G1. For signals G1, G3, G5, the vectors produced would be V0, V3, V2, V7, V2, V3 and V0. By performing the change to gating signals G1', G3' G5', the vectors produced are V4, V3, V2, V1, V2, V3 and V4. It should be noticed that the operation is in Sector S2 going from vector V3 to V2 and back, but substituting the V4 and V1 vectors for the zero-state vectors, V0 and V7. This reduces the common mode voltage.

Figure 12:
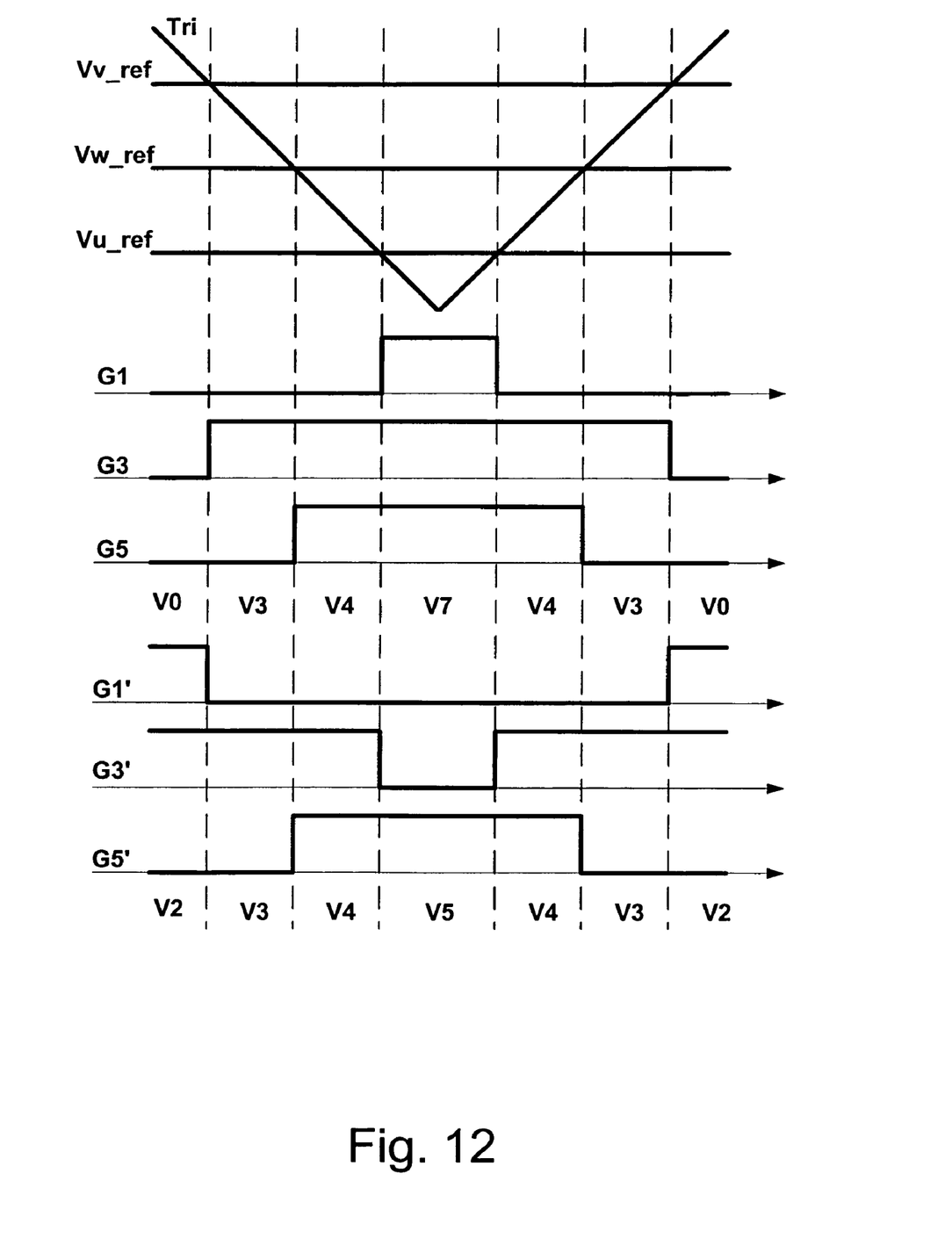

For the third sector of the space vector diagram, S3 in FIG. 2, the triangular carrier wave, Tri, is shown in FIG. 12, as it intersects the three reference voltages on the first three axes, for which it is assumed that $V_{v\_ref} > V_{w\_ref} > V_{u\_ref}$. The next three axes in FIG. 11 show the conventional gating signals, G1, G3, G5 for switches SW1, SW3, SW5. Gating signal G3 has the longest "on time" because $V_{v\_ref}$ exceeds Tri for the greatest interval. Gating signal G1 has the shortest "on time" because $V_{u\_ref}$ exceeds Tri for the shortest interval. The bottom three axes in FIG. 12 show that the gating signals can be changed so that G1'=1 if $V_{v\_ref}$<Tri; G3'=0 if $V_{u\_ref}$>Tri and G5'=G5. G1' becomes the inverse of G3 and G3' becomes the inverse of G1, while G5' remains the same as G5.

Figure 13:
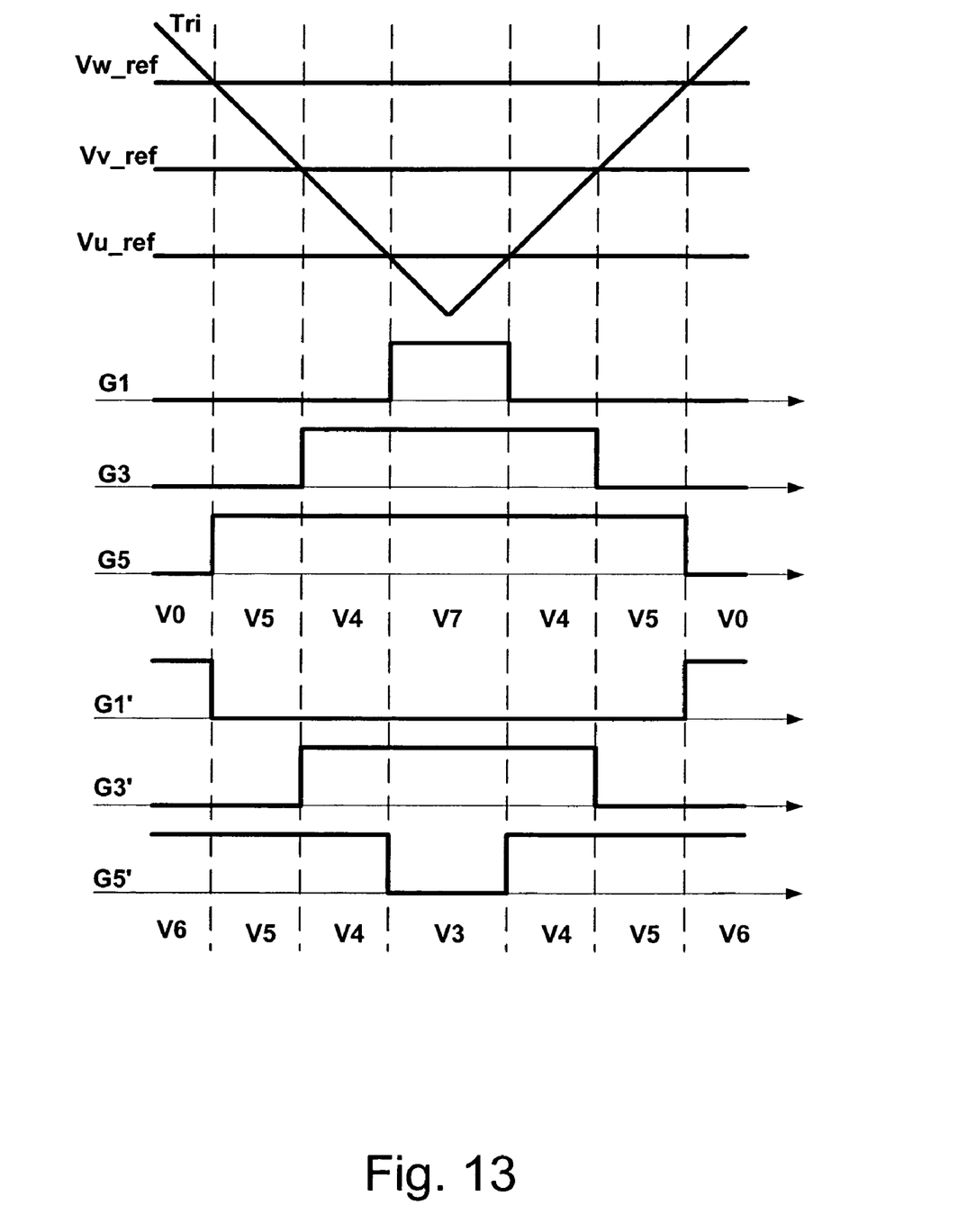
Figure 14:
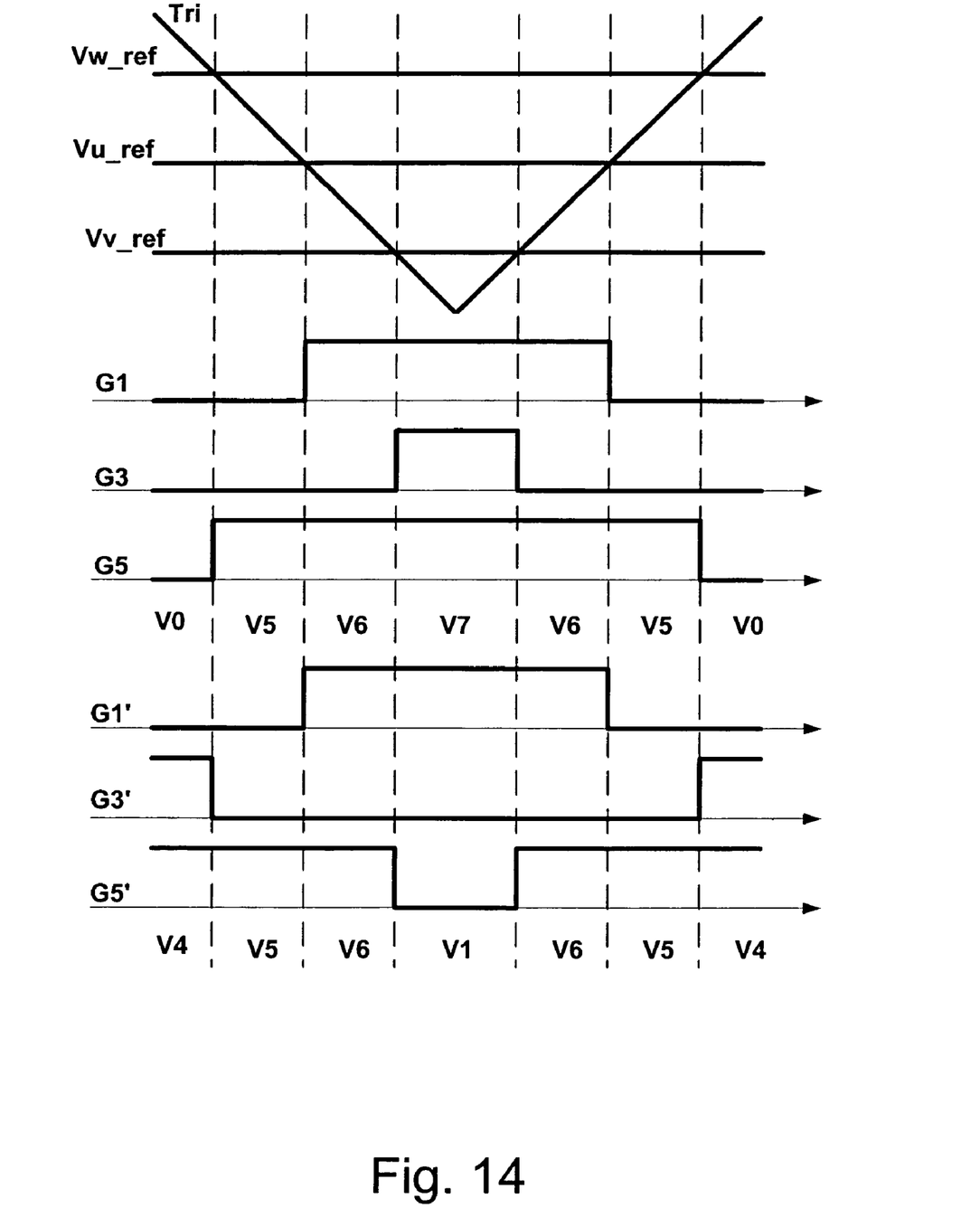
Figure 15:
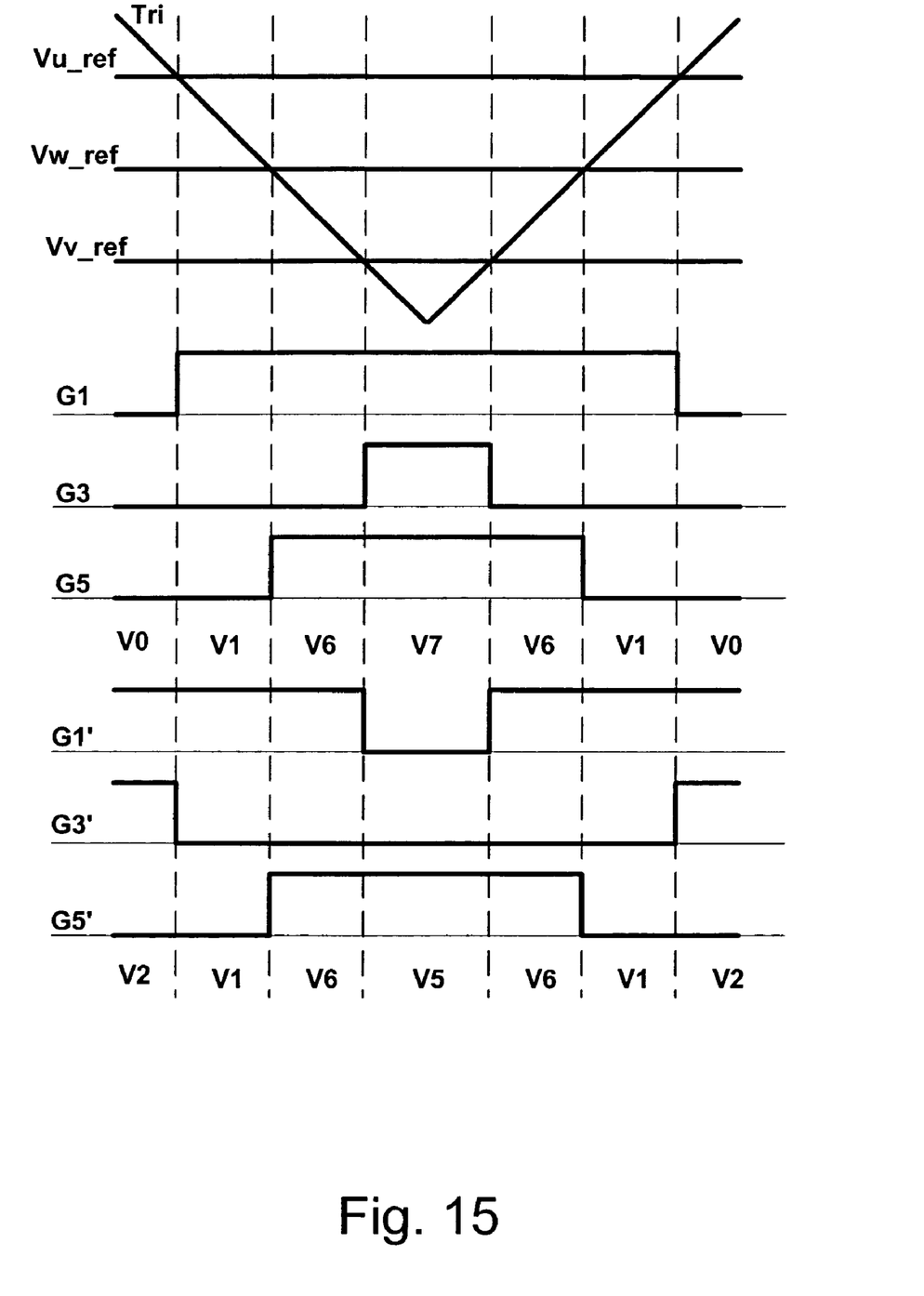

FIGS. 13–15 show the fourth through sixth sectors, S4–S6 of the space vector diagram seen in FIG. 2. In each of these sectors, one of the two gating signals G1', G3', G5' remains the same as its counterpart G1, G3, G5, while the other two are inverted.

Figure 16:
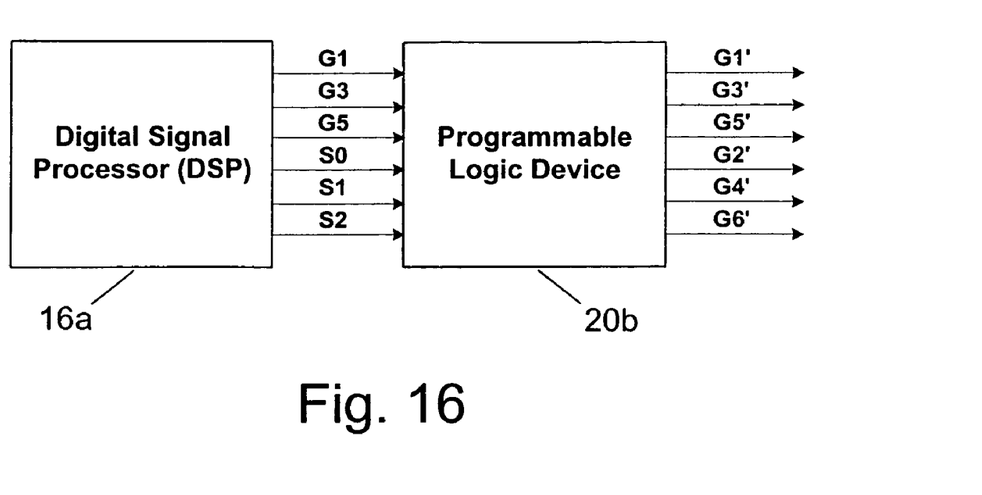
FIG. 16 shows a circuit diagram with a state table logic circuit for controlling the gating signals to the inverter switches.

Referring next to FIG. 16, the CPU 16 in the controller 10 can more particularly be a digital signal processor 16a, which generates gating trigger pulse signals G1, G3, G5 and sector logic signals S0, S1, S2 (three logical bits) to a pre-programmed read-only logic device 20b. The zero switching states can be avoided by changing the original trigger pulses G1, G3 and G5 to the modified trigger pulses G1', G3' and G5' by using the following logic equations 5), 6) and 7), where S2, S1 and S0 indicates three bits designating the identity of the sector S1–S6. The programmed logic device operates according to the following logic equations in mapping original trigger pulses G1, G3 and G5 and sector signals S2, S1 and S0 to modified trigger pulses G1', G3' and G5'.

$$G'_1 = G_1\overline{G_3} + G_1G_3\overline{G_5} + \overline{G_1G_3G_5} \qquad 5)$$
$$(\overline{S_2S_1}S_0 + \overline{S_2}S_1S_0 + S_2\overline{S_1S_0} + S_2S_1\overline{S_0}) +$$
$$G_1G_3G_5(\overline{S_2S_1S_0} + S_2\overline{S_1}S_0)$$

$$G'_3 = \overline{G_1}G_3 + G_1G_3\overline{G_5} + \overline{G_1G_3G_5} \qquad 6)$$
$$(\overline{S_2}S_1 + S_2\overline{S_1}S_0 + S_2S_1\overline{S_0}) +$$
$$G_1G_3G_5(\overline{S_2S_1}S_0 + S_2\overline{S_1S_0})$$

$$G'_5 = \overline{G_1G_3}G_5 + \overline{G_1}G_3G_5 + G_1\overline{G_3}G_5 + \overline{G_1G_3G_5} \qquad 7)$$
$$(\overline{S_2S_1}S_0 + \overline{S_2}S_1\overline{S_0} + S_2\overline{S_1}) +$$
$$G_1G_3G_5(\overline{S_2S_1}S_0 + S_2\overline{S_1S_0})$$

Figure 17:
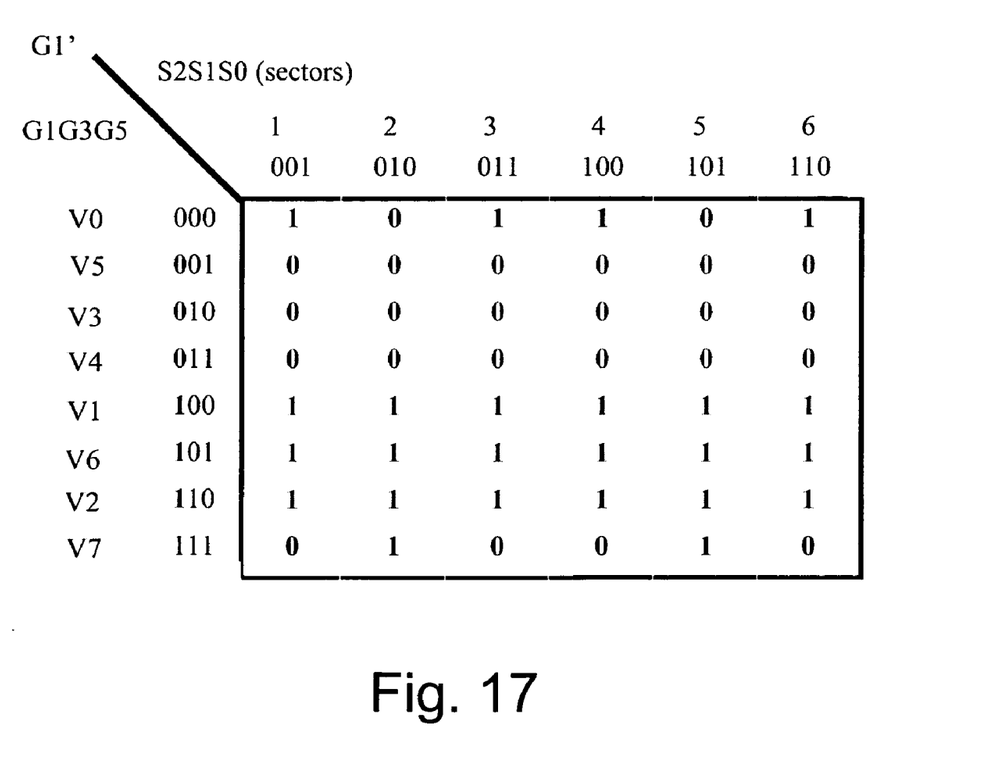
FIGS. 17–19 are state table logic diagrams for gate pulses, G1', G3' and G5', respectively.
Figure 18:
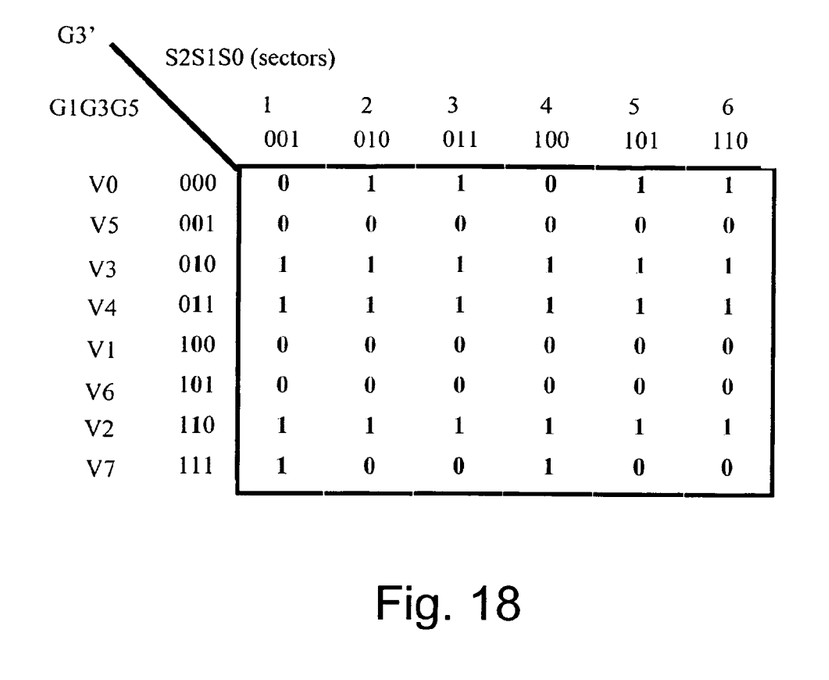
Figure 19:
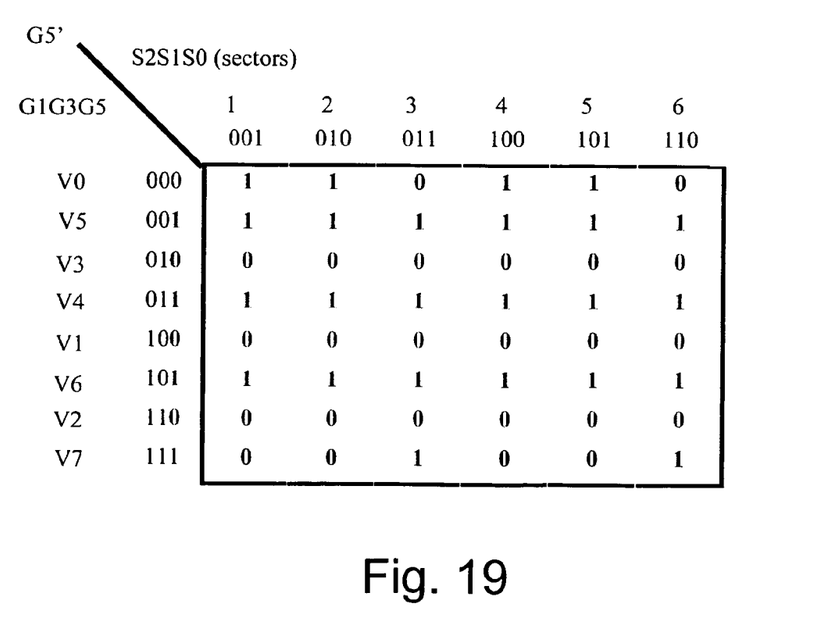

FIGS. 16–18 are logic tables for generating the modified trigger pulses G1', G3' and G5', respectively, as a function of the six sectors, S1–S6 of the SVPWM diagram in FIG. 2. By using this method, zero-voltage vectors V0 and V7 can be avoided and the peak-to-peak amplitude of the common mode voltage can be reduced. This logic produces the same sets of signals seen in FIGS. 10–15 for the six sectors S1–S6 of the SVPWM diagram of FIG. 2.

This has been a description of several preferred embodiments of the invention. It will be apparent that various modifications and details can be varied without departing from the scope and spirit of the invention, and these are intended to come within the scope of the following claims.

We claim:
1. A method of controlling switching in a DC-to-AC inverter to reduce a common mode voltage in an AC motor, the method comprising:
    comparing three phase voltages to each other to determine a maximum voltage in one phase, a minimum voltage in another phase and a middle voltage in still another phase;
    inverting phase voltages for one phase having the maximum voltage and another phase having the minimum voltage;
    comparing the phase voltages to a carrier wave to determine gating signals for three respective phases of the inverter; and
    inverting gating signals for the one phase having the maximum voltage and for another phase having the minimum voltage to reduce the common mode voltage in the motor.

2. The method of claim 1, wherein the comparing of the phase voltages to each other and the inverting of the gating signals for the one phase having the maximum voltage and for the other phase having the minimum voltage is performed by a microelectronic CPU under control of a stored program routine.

3. The method of claim 2, wherein in addition to inverting phase voltages for one phase having the maximum voltage and another phase having the minimum voltage, the inverted phase voltages are exchanged for each other.

4. The method of claim 1, wherein the inverting of the phase voltages and the inverting of the gating signals for the one phase having the maximum voltage and for the other phase having the minimum voltage are performed by non-CPU logic circuitry.

5. The method of claim 1, wherein a sequence of comparing three phase voltages to each other, inverting phase voltages for the one phase having the maximum voltage and another phase having the minimum voltage before comparing said phase voltages to a carrier wave, and inverting gating signals for the one phase having the maximum voltage and for another phase having the minimum voltage, is performed for each of six periods of the carrier wave.

6. A controller for controlling switching in a DC-to-AC inverter to reduce a common mode voltage in an AC motor, the controller comprising:
   outputs for providing gating signals to three phases in a three-phase inverter;
   a comparator for comparing the phase voltages to each other to determine a maximum voltage in one phase, a minimum voltage in another phase and a middle voltage in still another phase;
   a phase modulator for comparing the phase voltages for three phases to a carrier wave to determine a first plurality of the gating signals; and
   a common mode modulator responsive to determination of the maximum, minimum and middle voltage for inverting the phase voltages prior to comparison with the carrier wave and for inverting the gating signals for the one phase having the maximum voltage and for the other phase having the minimum voltage to reduce the common mode voltage in the AC motor.

7. The controller of claim 6, wherein the phase modulator includes a microelectronic CPU executing a first plurality of program instructions for the comparing of the phase voltages to each other and wherein the common mode modulator also includes the microelectronic CPU executing a second plurality of program instructions for inverting the gating signals for the one phase having the maximum voltage and for the other phase having the minimum voltage.

8. The controller of claim 7, wherein the common mode modulator includes the microelectronic CPU executing a second plurality of program instructions for exchanging as well as inverting the one phase having the maximum voltage and for the other phase having the minimum voltage.

9. The controller of claim 6, wherein the inverting of the phase voltages and the inverting of the gating signals for the one phase having the maximum voltage and for the other phase having the minimum voltage are performed by non-CPU logic circuitry.

10. The controller of claim 6, wherein the comparator for comparing the phase voltages to each other and the common mode modulator for inverting the phase voltages and inverting the gating signals for the one phase having the maximum voltage and for the other phase having the minimum voltage each repeat their respective operations for six periods of the carrier wave.

11. A kit configured to retrofit a controller configured to control switching of an inverter of a variable frequency drive system comprising:
   a memory unit having stored therein at least one of a plurality of logic equations and a map relating a first plurality of gating signals and an associated plurality of sector logic signals for switching an inverter of a variable frequency drive system to a second plurality of gating signals designed to exclude zero-voltage vectors; and
   a controller configured to receive the first plurality of gating signals and an associated plurality of sector logic signals, access the memory unit, and determine the second plurality of gating signals designed to exclude zero-voltage vectors from one of the plurality of logic equations and the map without calculating a dwell time.

12. The kit of claim 11 wherein the controller is configured to receive the first plurality of gating signals and an associated plurality of sector logic signals from a controller configured to control switching of the inverter.

13. The kit of claim 11 wherein the controller is further configured to communicate the second plurality of gating signals to a controller configured to control switching of the inverter.

14. The kit of claim 11 wherein the controller includes a one-time programmable logic circuit.

* * * * *